Figure 11:
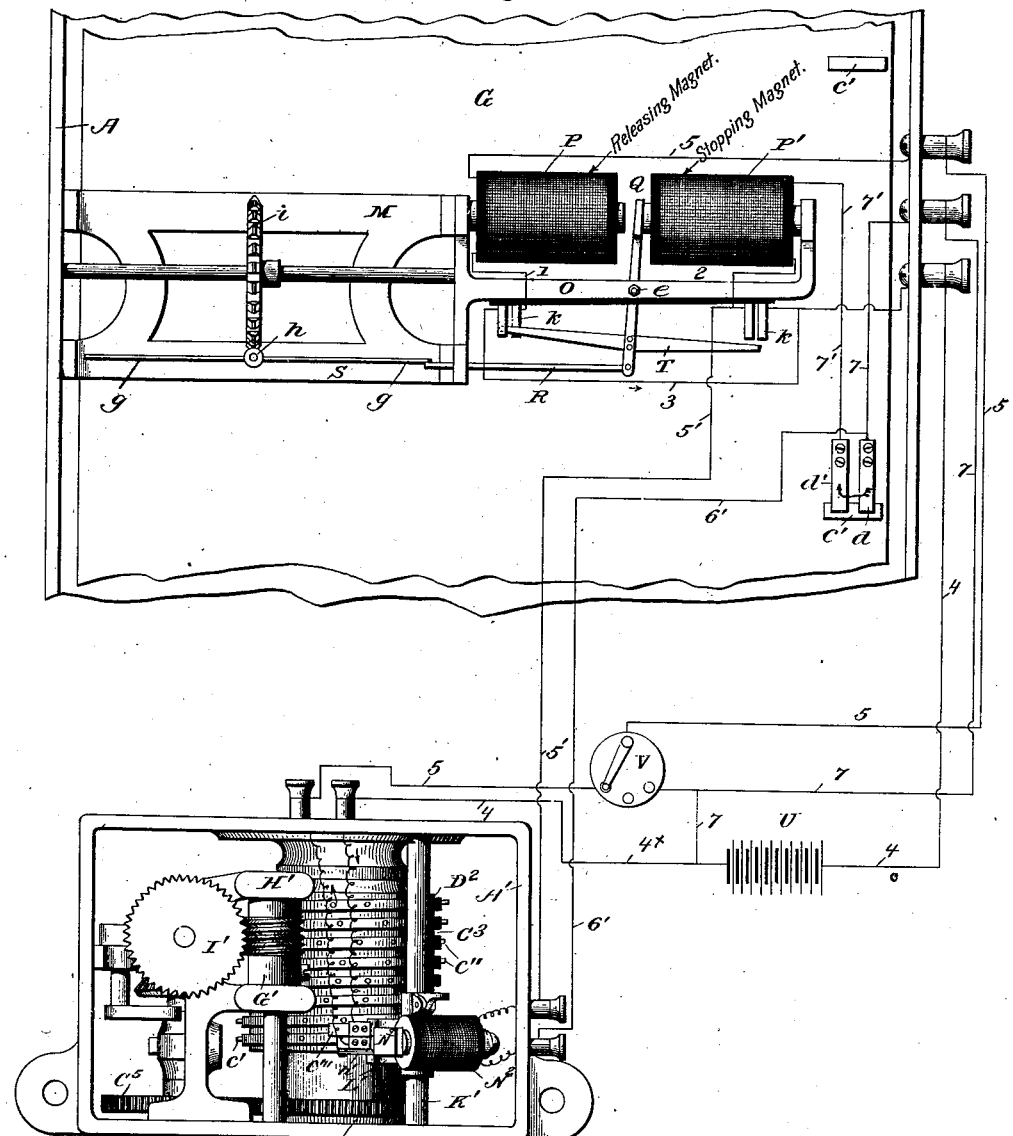

(No Model.)
R. B. AYRES.
STATION INDICATOR.
No. 475,378.
5 Sheets—Sheet 1.
Patented May 24, 1892.
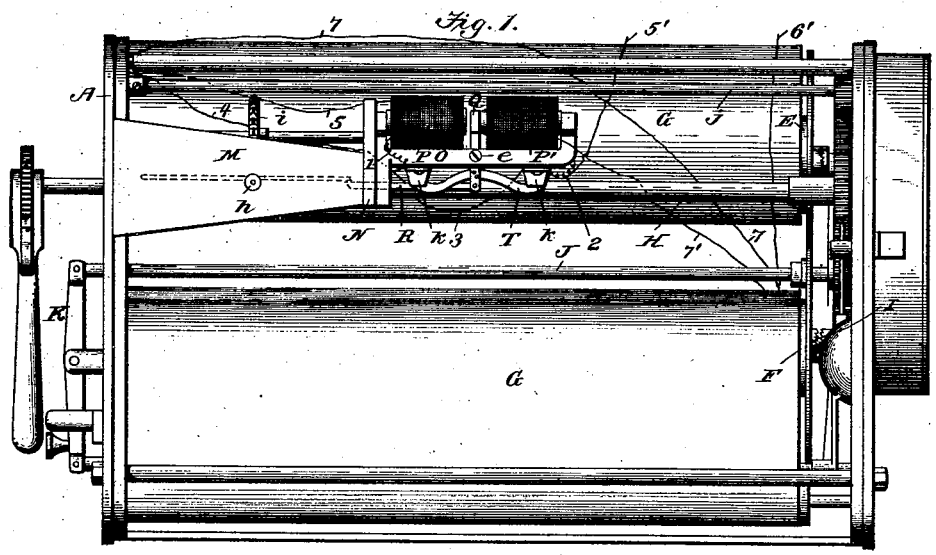
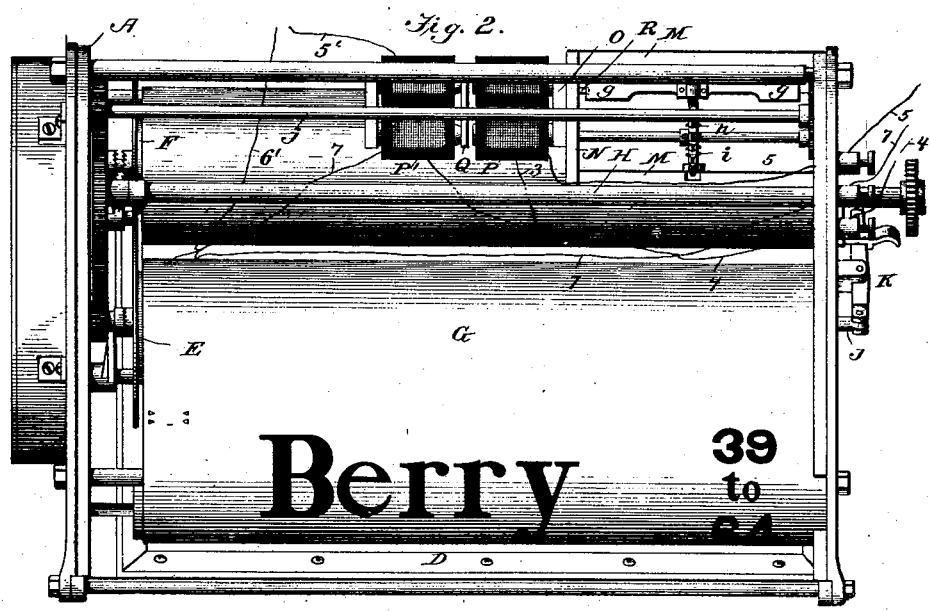

(No Model.)
R. B. AYRES.
STATION INDICATOR.
5 Sheets—Sheet 2.
No. 475,378.   Patented May 24, 1892.
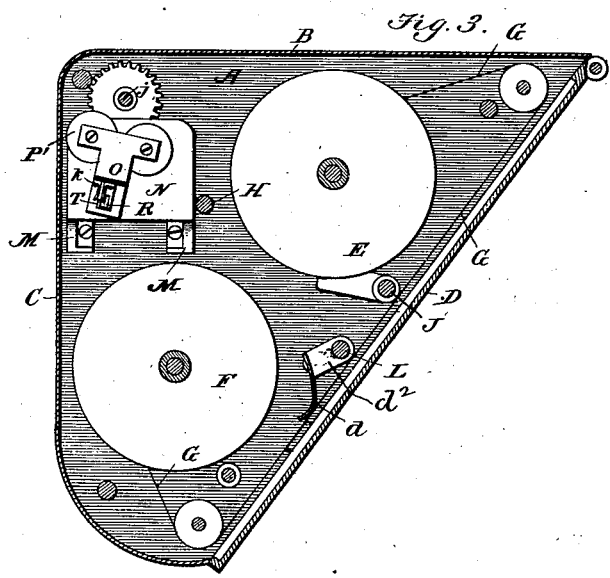
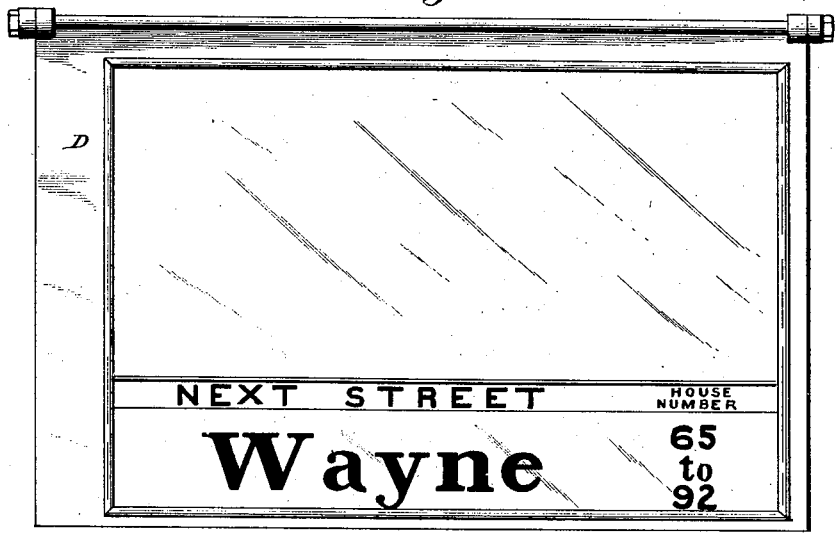
Witnesses   Ruben B. Ayres. Inventor (No Model.)
R. B. AYRES.
STATION INDICATOR.
No. 475,378.
5 Sheets—Sheet 3.
Patented May 24, 1892.
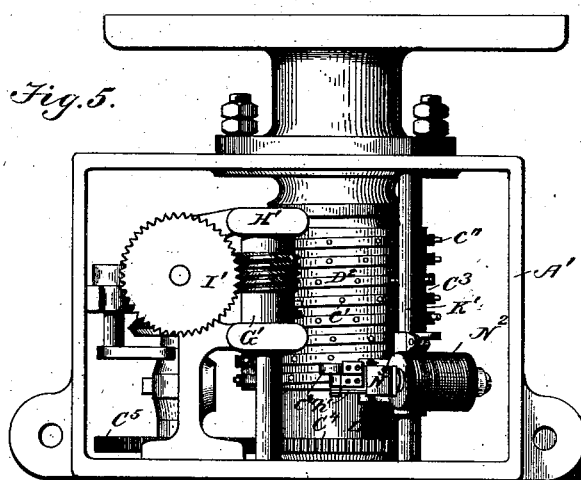
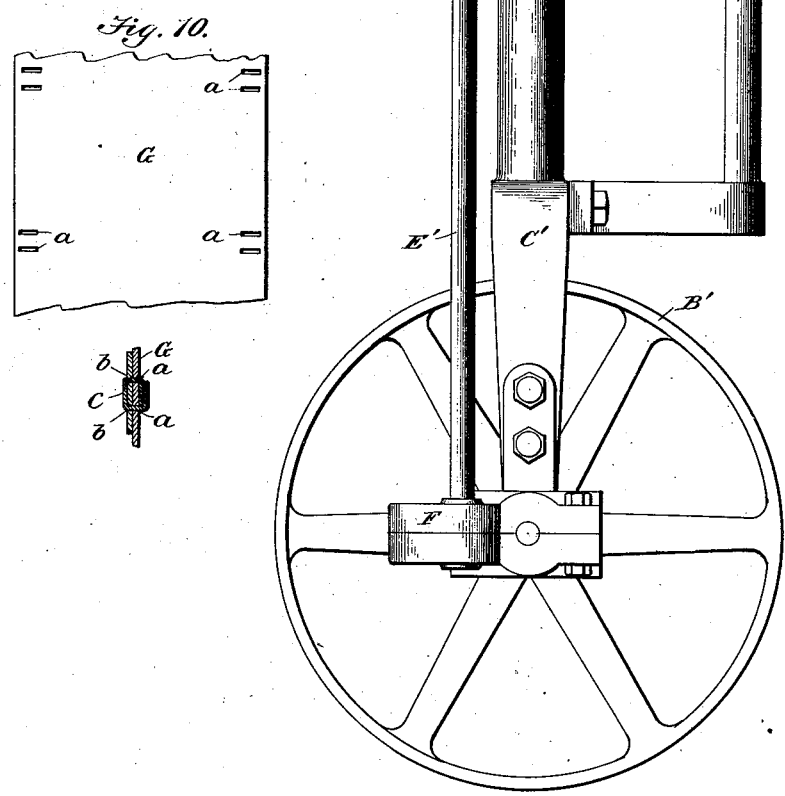
Witnesses
Edwin L. Bradford
A. Curtis Lammond
Ruben B. Ayres, Inventor
By Wm C. McIntire
Attorney (No Model.)
R. B. AYRES.
STATION INDICATOR.
No. 475,378. Patented May 24, 1892.
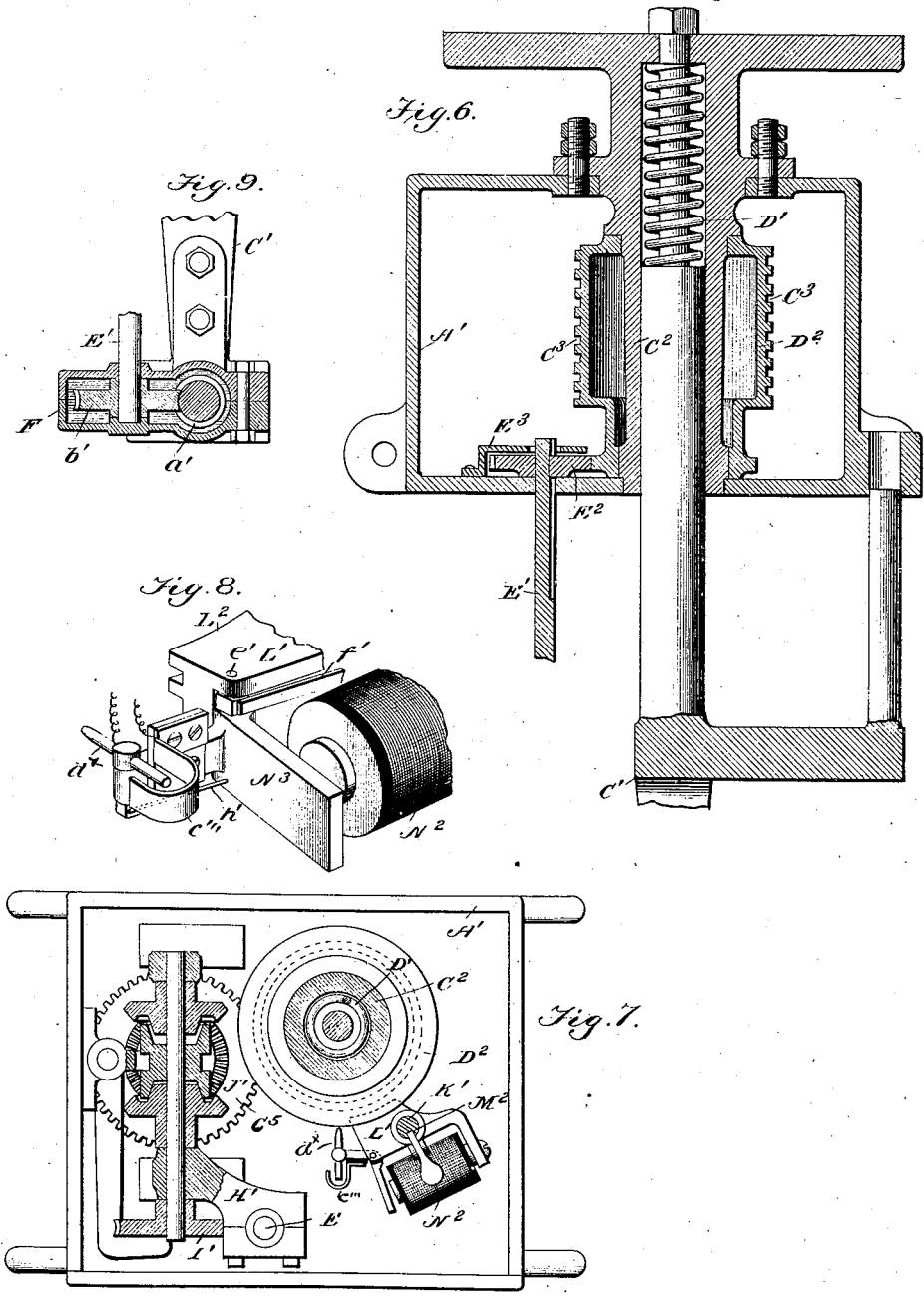
Witnesses
E. Everitt Ellis
N. Curtis Lammond
Ruben B. Ayres Inventor
By [signature]
Attorney (No Model.)

R. B. AYRES.
STATION INDICATOR.

No. 475,378. Patented May 24, 1892.

Witnesses
Inventor
Ruben B. Ayres.
By
Attorney

UNITED STATES PATENT OFFICE.

RUBEN B. AYRES, OF NEW YORK, N. Y.

STATION-INDICATOR.

SPECIFICATION forming part of Letters Patent No. 475,378, dated May 24, 1892.

Application filed December 3, 1891. Serial No. 413,928. (No model.)

*To all whom it may concern:*

Be it known that I, RUBEN B. AYRES, a citizen of the United States, residing at New York, in the county of New York and State of New York, have invented certain new and useful Improvements in Station-Indicators; and I do hereby declare the following to be a full, clear, and exact description of the invention, such as will enable others skilled in the art to which it appertains to make and use the same.

This invention relates to certain new and useful improvements in electrical street or station indicators; and it consists, substantially, in such features of arrangement, construction, and combinations of parts as will hereinafter be more particularly described, and pointed out in the claims.

The invention is designed more particularly as an improvement upon the class of electrical street or station indicators described and claimed in my application for Letters Patent filed February 16, 1891, and serially numbered 381,577, and also upon that form which is described and claimed in a subsequent application filed July 27, 1891, and serially numbered 400,814, the two forms being so embodied in one as to produce an apparatus capable of performing the desired work with a much greater degree of accuracy, as well as reliability.

In the former application, first above referred to, I have shown and described a certain form and arrangement of indicating band or ribbon, together with the shafts or drums around which the same is wound as the apparatus is set in motion by electro-motive force; also, a clutch and shifting device, whereby the direction of rotation of said shafts or drums is changed to alter the direction traveled by said band or ribbon; and, further, I have described and shown in said application a peculiar form and arrangement of contact-points, electro-magnets, and armatures which are operated by electric force to set in motion the several parts which operate to successively indicate to passengers the names of streets or stations lying along the route traveled by the car or other vehicle in which the apparatus may be placed.

In the former application, second above referred to, I have set forth and claimed a peculiar form and arrangement of rotating contact-disk, which is set in motion or operated by means of suitable mechanism or connections between said disk and a trail or measuring wheel which travels over the surface of the track-rails in like manner as the wheels upon which the body of the car or other vehicle is supported and carried.

The reference thus made to the inventions covered by my two former applications referred to is solely for the purpose of enabling the general character or nature of this my present invention to be better understood, and in the description which is to follow hereinafter no further designation of the old parts will be employed other than that which may be found absolutely necessary to a full and better understanding of what is intended to be covered by this specification.

The object of the present invention is to accomplish in a much simpler and better way the combined results of the two former inventions referred to, as well also as to greatly economize in amount of space occupied by the several operative parts.

A further object of the invention is to economize the amount of electro-motive power or energy employed, and also to render more accurate and positive the working of the several parts of which the invention is comprised, all as will more fully hereinafter appear when taken in connection with the description hereinafter following, and the accompanying drawings, in which—

Figure 1 represents a plan view of the interior mechanism, with part of casing removed, when looking at the same from that side which lies against the structure which supports the same when placed above a car-door or in any other convenient place. Fig. 2 is a plan view of the interior mechanism, with top of casing removed, when looking at the same from the top. Fig. 3 is a view of the interior mechanism, partly in section, end of casing being removed, when looking at the same from one end, the apparatus being represented in the position it occupies when in use in a car or other vehicle. Fig. 4 is a front view of the apparatus when in use. Fig. 5 is a vertical elevation, partly in section, of the mechanism employed between the track or measuring wheels and the bottom of the car for setting in action the circuit making and breaking devices, as well as the devices which actuate and control such circuit making and breaking devices. Fig. 6 is a vertical sectional elevation of the measuring-wheel fork and the drum surrounding the same, together with its casing, the said view more clearly indicating the construction and arrangement of these parts. Fig. 7 is a top or plan view of the mechanism illustrated in Fig. 5, showing the top of the casing therefor removed. Fig. 8 is a detail view in perspective of the devices for forming the electrical contact through the action or medium of the spirally-grooved rotating drum located beneath the car; and Fig. 9 is a sectional detail view of the connection employed between the shaft of the trail-wheel and the vertically-movable upright shaft, whereby the motion imparted to said wheel is transmitted to said shaft. Fig. 10 is a detail view representing the manner of fastening the advertising-cards to the indicator-ribbon; and Fig. 11 is a general view in outline of the two sets of mechanism or devices, showing the electrical connections between the two and how the two sets of said devices are operated conjointly in producing the results desired.

In carrying my present invention into effect I employ for the mechanism designed to be located within the car a suitable box or casing, preferably with its front or face inclined or slanting with respect to the back and top thereof, so that when placed within a car the names of the several streets or stations will be so displayed as to be conveniently read or noticed by the passengers, while at the same time the bulk of the apparatus will not be as great and no collision therewith experienced by passengers and others who might have to occupy a standing position in the car at or beneath the place where the apparatus may be located or supported. Within said casing I locate or arrange from end to end thereof the usual rotating shafts or drums, which operate the indicating band or ribbon, as well, also, as the strengthening-rods which hold the casing together, the shafts which support some of the electro-magnets employed, the shafts or rods which effect the winding of the drum-spring, and the clutch devices through the medium of which the direction of rotation of the rotating drums is changed or altered. The form and arrangement of the several drums, clutches, devices for shifting the latter, and the spring which revolves the ribbon-drums is substantially the same as that employed in my former application first hereinbefore referred to; but the construction and arrangement of the magnets and armatures is different, as will appear more fully hereinafter. In the present instance, also, I employ, in connection with the trailing or measuring wheel and the vertically-movable upright shaft of the invention, covered by my application second above referred to, a spirally-grooved drum, which is set into slow motion by means of intermediate mechanism connecting it with said upright shaft and at distances apart corresponding with the distance between streets or stations (which is of course previously calculated or determined, as will be understood.) Suitable points or projections are formed on said drum, (on the divisions of its spiral groove,) which serve to operate a peculiarly-arranged contact-point for establishing a closed electric circuit with the mechanism located in the car, and thereby cause the indicating mechanism proper to be operated or set in motion. The contact-point referred to is carried or supported by a pivotal or swinging armature, which in turn is supported by the frame of a magnet, a portion of which works or moves in the spirally-arranged grooves formed around the circumference of the rotated drum hereinbefore referred to. The said magnet-frame is made vertically movable on an upright rod extending between the top and bottom of the casing which incloses the same, while a portion of said frame is formed to fit the groove of the revolving drum, so that as the drum is moved or turned the said frame, together with its magnet, the swinging armature, and the contact devices, will all be raised or lowered together, accordingly as the drum be caused to rotate in one direction or the other. In this way the proper relation which the contact-point should bear to the projections on the drum will always be maintained and perfect accuracy secured in bringing the names of the stations to view.

Reference being had to the drawings by the letters marked thereon, A represents the casing for inclosing those portions of the operative mechanism designed to be located within the car, and which, as shown, is constructed of a top B, a backing C, and a front D, intersecting the top and back in a slanting or inclined manner and left with an opening of sufficient dimensions to enable advertisements and the names of streets or stations to be read through the same. The ends of the casing are constructed in conformity with this construction, as shown, and supported between such ends are the shafts of the rollers E F, around which the indicating band or ribbon G passes or is wound. The said drums E F are operated to revolve by any well-known form of spring (not shown) on one end of a shaft H, extending between the ends of the casing intermediate of the rollers, and in order to change the direction of rotation thereof, accordingly as the stations are to be brought to view in direct or reverse order, any suitable clutch or shifting mechanism may be employed—such, for instance, as that shown and described in my former application first above referred to. In the present case I have shown such form of clutch and shifting devices, (designated by the letters I, J, and K,) and no further mention need be made thereof.

The indicating band or ribbon G passes from one roller to the other in an obvious manner, and the names of the several streets or stations are printed thereon in successive order, leaving a space between the names of each two stations or streets sufficiently large to receive different advertising-cards, which will appear before the opening in the front of the casing as the names of the streets appear. In order to enable the several advertising-cards to be removed from time to time and substituted by others without the necessity of changing the entire indicating band or ribbon itself, I form in each of the four-corners of the spaces allotted to such advertisements two corresponding slits $a\ a$, while in the corresponding corners of the advertising-cards themselves I provide similar slits $b\ b$, and I fasten the cards in place by passing the ends of small fasteners $c$ through the slits in the manner shown in the drawings (see Fig. 10) and stick them together by a paste or mucilage, so as to hold the cards. To remove a card, it is simply necessary to sever the fastenings $c$ by means of a knife-blade or otherwise. The inner surface of said indicating band or ribbon G is provided with a series of small metal strips $c'$, Fig. 11, which occur alongside the names of the streets or stations, and these strips $c'$ are for the purpose of forming electrical contact with a pair of contact-points $d\ d'$, carried by an insulated block $d^2$ on the brace-rod L, which extends between the ends of the machine, as shown. The purpose of having the strips $c'$ come into contact with the points $d\ d'$ will be more fully explained hereinafter.

Supported by one end of the casing A from within and extending partly into the casing are two brackets M M, which carry at their ends a plate or disk N, to which is secured and held a yoke or frame O, in which are arranged two sets of electro-magnets P P', having an armature Q disposed between the same and adapted to be alternately attracted thereby. The said armature Q is pivoted to the frame O, as shown at $e$, while pivoted or linked in like manner to the lower end of the armature is a sliding or movable tongue R, the end of which passes freely through an opening in the plate or disk N and serves normally as a stop for the wings $g$ of a butterfly regulator S, which latter has its bearings in the brackets M M, and is formed or provided on its spindle with a worm $h$, which meshes or engages a worm-wheel $i$, having its shaft-bearings in one end of the casing A, and the plate or disk N. That end of the worm-wheel shaft which is supported by the end of the casing is provided with a small pinion, (not shown,) which meshes with a pinion on the rod or shaft $j$, that receives motion from the shafts or drums upon which the indicating-ribbon is wound. These last-named devices are of ordinary form and use, and as the motion thereof is under the control of the regulating devices just described it will be apparent that the parts will operate in a uniform and regular manner.

To the lower end of the armature Q there is also secured a lever T, while secured to the frame O, at near the opposite ends thereof, are the split or bifurcated metal contacts $k\ k'$. Normally the ends of the lever T pass between the said contacts $k$; but whenever the armature Q is attracted by either set of magnets P P' the movable sliding tongue R will be drawn in or out, as the case may be, and the said lever will be caused to strike or touch one or the other of the contacts $k\ k'$, according to the direction the armature moves. Between the set of magnets P and the contacts $k$ an electrical connection is had by means of the conducting-wire 1, while between the other set of magnets P' a similar connection is formed with the other contact $k'$ through the medium of conducting-wire 2. The said metal contacts $k\ k'$ are also in electrical communication with a battery U through the conducting-wires 3 3 and a conductor 4, leading to the battery. No attempt will be made at this point to describe the several electric connections and circuits, since a more complete description thereof will be given farther on. A suitable switch is used for enabling the battery-power to be shut off or economized, and this switch, too, will be also referred to hereinafter.

The description thus far furnished relates entirely to the mechanism which it is intended shall occupy a position inside of the car or other vehicle in which employed, and I shall now proceed to describe the construction and arrangement of the devices or mechanism located outside of or beneath the car. I shall also describe the connection between the two sets of devices or mechanism, from which it will be seen in what manner the same co-operate to produce the results desired to be accomplished. Before proceeding with the description of the outside mechanism, however, I desire to state that the vertically-movable shaft, the trail-wheel, and the shifting devices for reversing the action of the parts constituting the lower or outside mechanism are substantially the same as that shown and described in my former application, second hereinbefore referred to, some slight alterations being made to suit the requirements of the present case. In some instances I dispense with the shifting or reversing mechanism altogether, all as will more fully hereinafter appear. Referring to said lower or outside mechanism, A' represents an inclosing box or casing for the principal operative parts thereof, the said box or casing being adapted to be secured to the bottom or under side of a car or similar vehicle.

B' represents the trail or measuring wheel of my former invention, the same being designed to move or travel upon the track-rails (not shown) in like manner as the wheels upon which the body of the car is supported, the said trail or measuring wheel having its bearings in the lower end of a steering-fork C', the stem of which passes upward through the casing A' and bearing around the same a spiral spring D', the tendency of which is to always maintain the trail or measuring wheel down upon the track-rail; but when an obstruction is encountered by said wheel the fork will be raised against the action of the spring, and after the obstruction is passed the said spring will again force the wheel down.

Surrounding the upper portion of the sleeve $C^2$, in which the stem of the fork works, is a drum $D^2$, having formed around its circumference a continuous spiral groove $C^3$, the said drum being formed or provided on its lower end with a cog $C^4$, which is engaged by a cog-wheel $C^5$, carried and operated by the clutch or shifting devices in such manner as to impart a slow rotating movement to said drums. The divisions between the groove of the drum are formed with a series of lifting points or projections $c''$, each of which is supposed to represent a street or station passed by the car, and which serve to operate a movable electric contact-pin, more fully hereinafter explained.

The journal of the axle of the trail-wheel is provided, as in the former invention referred to, with a worm-gear $a'$, meshing with a worm gear-wheel $b'$, carried on the lower end of the vertically-movable upright shaft E', and these gears are inclosed within a hollow bracket F, secured to the side of the wheel-fork, as shown. The said upright shaft E' extends upwardly into the casing A', parallel to the wheel-fork, and at its upper portion is formed with a kerf or groove, which receives a spline or key (not shown) formed on the inner side of a hollow worm G', which surrounds the said upper portion of the shaft, as shown, and this hollow gear is free to turn or rotate within a stationary frame H' as the shaft is rotated; but it is prevented from being lifted with the shaft by virtue of the said frame. The said worm G' meshes with a wheel I', which operates the clutch or shifting mechanism J', (shown in Figs. 5, 7, and 11,) which mechanism is the same as that used heretofore, except that instead of a gear-clutch the parts work by friction. These shifting devices need not now be more specifically referred to, since the operation will be thoroughly understood from the reference that has been already made. They are intended to be used only when the line or route traveled by the car is a continuous one, or where the movement of the trail-wheel is to be reversed, as when the car is starting on a new trip, or completely turned around to retrace the same line or route. In instances where the car or other vehicle is drawn or propelled by animal-power the said car or vehicle is not always turned around to retrace its course; but instead the animal is simply changed from one end of the car to the other and the car then altered to the return-track by means of switch-rails. Under such circumstances there would be no need of any device or mechanism to reverse the action of the several parts, since the mere reversal of the direction of rotation of the trail-wheel itself would effect this change, and consequently in such cases I dispense with the shifting devices. The only change made is to simply key to the upright shaft E' a gear-wheel $E^2$, which works in a frame $E^3$, similarly as the hollow worm G', above mentioned. (See Fig. 6.) In this arrangement the drum will be rotated in either direction, accordingly as the trail-wheel moves in one direction or the other, while at the same time the trail-wheel will be lifted in precisely the same manner as before whenever an obstruction thereto is encountered. The purpose of having the trail-wheel rise upward is to prevent breakage or damage to the several parts.

Secured between the top and bottom of the casing A' is a rigid or stationary upright rod K', the same being in close proximity to the grooved drum, and working on said rod is a vertically-movable frame L', the same being splined to the rod, as seen at $M^2$, Fig. 7, so as to be capable of movement thereon, yet still maintain its position relatively to the drum. The said frame L' has a slightly-curved portion $L^2$, which works in the groove of said drum, so that as the drum is rotated the frame will be either raised or lowered therewith and to an extent corresponding to the degree of movement thereof. The said movable frame is provided with an electro-magnet $N^2$, and has also pivoted thereto at one side a swinging armature $N^3$, to which is attached or secured a curved or U-shaped piece of metal $c'''$, that constitutes an electric contact, which at proper intervals is touched or engaged by a vibrating or pivoted contact-needle $d^x$, thereby completing an electric circuit with the upper or inside mechanism that operates the traveling indicator band or ribbon to move. A portion of the pivot $e'$, on which the swinging armature $N^3$ works is squared, as shown, (see Fig. 8,) and this head works against the end of a flat spring $f'$, held by the armature-frame. The action of the spring is to force the armature outward after the same has been attracted by its magnet, and thus again open the electric circuit that is momentarily closed whenever the said magnet becomes energized. Working in one end of the armature $N^3$ is the pivoted electric needle $d^x$, the same being normally disposed so as to extend into the space between the sides of the curved or U-shaped contact $c'''$. The lower end of the pivot on which this needle works is also squared, as shown, and works in like manner against the end of a small spring $h'$, secured to the upper surface of the arm $N^6$ of the armature $N^3$. (See Fig. 8.) From this construction and arrangement the action will be that whenever the contact-needle is caused to be brought into contact with either of the sides of the U-shaped contact $c'''$ a circuit will be established, (as will be described in the description of the operation,) and as soon as such circuit is again cut off the spring $h'$ will be moved back to its former or original position. The needle is designed to be operated by the projections on the drum.

Located or arranged at any preferred point within the electric circuit is the switch or cut-off V, so that whenever desired the electric current can be cut off, and thus will the consumption of battery-power be greatly saved or economized.

It will be understood that other means of restoring the contact-needle to its central position between the contacts $c'''$ could be employed, and also that the particular shape of such contact $c'''$ might be varied or altered, and consequently I do not wish to limit myself to their particular form and arrangement. It will, further, be understood that the arrangement of the rotating spirally-grooved drum could be materially altered, as well also as the devices or means through the medium of which the same is rotated. I have thus far found it more convenient to rely entirely upon the action of the drum in operating the vertically-movable magnet and its frame, although other means might be resorted to for the same purpose, and neither, therefore, do I wish to limit myself in this particular.

Before proceeding with a description of the operation of my invention I will first describe the several circuits to enable such operation to be more fully comprehended.

The magnet P and the energizing-circuit including the same I shall term the "releasing-magnet and circuit," because by the operation of that magnet the clock-work or spring-motor is released from control of the detent or tongue R. For a corresponding reason I shall term the magnet P' and its energizing-circuit the "stopping-magnet and circuit." Each circuit contains a set of contacts closed intermittently by mechanically-operated devices, the starting-circuit having the set of contacts $c''' \, d^x$, controlled by the contact-closing drum $D^2$, and the stopping-circuit having the set of contacts $d \, d' \, c'$, the movable one of which is fast to and travels with the ribbon G, which is driven by the spring-motor, and each circuit contains, also, a set of contacts intermittently closed by electrically-operated agencies, the starting-circuit having the stationary contacts $k$, the stopping-circuit having the stationary contacts $k'$, and there being a movable contact T, controlled by the stopping and starting magnets and common to both contacts $k$ and $k'$, and so arranged that when the one circuit is closed at $k$ the other circuit is open at $k'$, and vice versa, and the arrangement, further, is such that when either circuit is closed the energizing-magnet of that circuit will act upon the movable contact T to at once break its own circuit and to close the contacts with which T co-operates in the other circuit. The mechanically-operated contacts are closed in advance of the electrically-operated contacts, and each circuit—stopping and releasing—is closed momentarily only, its normal condition being open. The releasing-circuit is from one pole of battery, via $4^x$, contacts $c''' \, d^x \, 5$, through magnet P $1 \, k' \, 4$, to other pole of battery. The stopping-circuit is from one pole of battery, via 7, contacts $d \, c' \, d' \, 7'$, through magnet P' $2 \, k' \, 4$, to other pole of battery. The magnet $N^2$, which I shall term the "contact-breaking" magnet, because it acts to permit the separation of the contacts $c''' \, d^x$ after they are closed by the drum $D^2$, is in a circuit in which are included contacts controlled by the stopping and releasing magnets, the arrangement being such that the contacts are closed whenever the releasing-magnet is energized and are opened whenever the stopping-magnet is energized. For this purpose I can conveniently place the circuit-breaking magnet in a shunt from the stopping-circuit and can use the contacts $k' \, T$ as the contacts for that shunt. Such is the arrangement illustrated in the drawings, the circuit-breaking circuit being from one contact $k'$, via 5', through magnet $N^2$ 6' 7, battery 4 4, back to other contact $k$. This circuit is closed so long as the contacts $k'$ are closed by the movable contact T. With regard to the contacts $k \, k'$, arranged on the frame of the duplicate sets of electro-magnets in the upper casing A, it should be remarked that these contacts are each formed of two conductors insulated from each other and brought into electric connection through the medium of the lever T, carried by armature Q. The magnet $N^2$ and its circuit might be dispensed with, for in that event the pins in the contact-closing drum $D^2$ would act first to close the contacts $c''' \, d^x$, and then after this closure to swing the pivoted arm in which they are mounted far enough to one side to allow it to clear the pins; but I prefer to use the magnet, because thereby the contacts $c''' \, d^x$ immediately after their closure are lifted away from the drum, so as to allow them to resume their normal open position, and are so held until the stopping-magnet is again energized, at which time the circuit of magnet $N^2$ is broken at $k'$, thus permitting the contacts $c''' \, d^x$ to drop back again into position to be actuated by the next succeeding pin on the rotating contact-closer.

The operation is as follows: In Fig. 11 the parts are represented in the position they assume just after the contacts $c' \, d \, d'$ of the stopping-circuit has been closed. Prior to the closing of these contacts the contacts $k' \, T$ were closed and the armature Q rested against the poles of the releasing-magnet P. The closing of the contacts $c' \, d \, d'$ closed the stopping-circuit and energized the stopping-magnet with the effect of pulling the armature over to the position indicated and then breaking the stopping-circuit at $k'$ and closing the contacts $k$ of the releasing-circuit. With the parts in this position the car proceeds on its way. As the trail or measuring wheel moves upon the surface of the track-rail the vertically-movable shaft will be caused to rotate and the spirally-grooved drum moved or turned correspondingly until one of the points or projections on the surface of said drum strikes against the vibrating contact-needle $d^x$. As soon as the needle is thus struck it will be swung around, so that its inner end will touch one of the sides of the U-shaped contact $c'''$, thus completing the releasing-circuit. The releasing-magnet P is thereby energized, and, attracting the armature-lever Q, retracts the detent R, thus releasing the spring-motor, which at once puts the ribbon G in motion, the contact $c'$ thereon being thus carried beyond the contacts $d\,d'$. At the same time this movement of the armature-lever Q causes the movable contact T to tilt in a direction to open the releasing-contacts $k$ and to close the stopping-contacts $k'$; but as the contact $c'$ has cleared the contacts $d\,d'$ the stopping-circuit is open, although the contacts at $k'$ may be closed. The closing of contacts $k'$, however, has the effect of closing the contact-breaking circuit and the contact-breaking magnet $N^2$ being thus energized attracts its armature and thus lifts or draws back the contact-needle $d^x$ away from and out of reach of the drum $D^2$ and its pins, the needle being thus held until by the next closing of the stopping-circuit the contacts at $k'$ are broken. This next closing of the stopping-circuit is brought about by the next contact $c'$ on the traveling ribbon. The spring-motor thereby is stopped and remains at rest until the next succeeding pin on the contact-making drum $D^2$ closes the releasing-circuit, as hereinbefore described. Thus the stopping and releasing circuits contain each two sets of contacts, the one electrically and the other mechanically operated, the electrically-operated being closed in advance of the mechanically-operated ones, and the closing of each circuit operating at once to open the electrically-operated contacts in that circuit and to close the similarly-operated contacts in the other circuit.

Having thus described my invention, what I claim as new, and desire to secure by Letters Patent, is—

1. In an electrical street or station indicator, the combination of a duplicate set of electro-magnets, an intermediate armature, a tongue movably connected to said armature and working back and forth longitudinally, and a suitable battery and wire connections for energizing the magnets, substantially as described.

2. In an electrical street or station indicator, the combination of a duplicate set of electro-magnets, an intermediate armature, a movable tongue operated by said armature, a pair of rollers, a speed-regulator normally arrested or engaged by the tongue, and a suitable battery and wire connections for energizing the magnets, substantially as described.

3. In an electrical street or station indicator, the combination of a duplicate set of electro-magnets, an intermediate armature, a tongue movably connected to said armature and working back and forth longitudinally, a pair of rollers, a speed-regulator for said rollers normally arrested by the tongue, a lever carried by said armature, electrical points with which the ends of the lever alternately come into contact, and a suitable battery and wire connections for energizing the magnets, substantially as described.

4. In an electrical street or station indicator, the combination, with the casing A, having the brackets extending therein and supporting at their ends a disk or plate, of a duplicate set of magnets supported by said disk, an intermediate armature, a movable tongue operated by said armature and working through the disk, an automatic regulator sustained between the brackets and normally arrested in its motion by contact with the tongue, and a suitable battery and wire connections, substantially as described.

5. In an electrical street or station indicator, the combination, with the casing A and the brackets extending into the same from one end thereof and supporting a disk or plate, of a duplicate set of magnets, an intermediate armature, a movable tongue operated by said armature and working through the disk, an automatic regulator normally arrested by engagement with the tongue, a lever carried by the armature, electric contacts with which the ends of the lever alternately come into engagement, and a suitable battery and wire connections, substantially as described.

6. In an electrical street or station indicator, the combination, with the trail-wheel and vertical or upright shaft, of a helically-grooved revolving drum, intermediate rotary mechanism between said shaft and drum, means for reversing said rotary mechanism, a vertically-movable frame working in the groove of the drum, and an electro-magnet carried by said frame, substantially as described.

7. In an electrical street or station indicator, the combination of a revolving drum having a continuous spiral groove and formed or provided intermediate of said groove with a series of points or projections, a vertically-movable frame, a magnet carried by said frame, a pivoted armature, and electric-contact devices operated by the projections of the drum, substantially as described.

8. In an electrical street or station indicator, the combination of the grooved drum provided with the projecting contacts, the vertically-movable magnet-frame, its magnet and swinging armature, the contact-point $c'''$, carried by said armature, and the vibrating contact-needle, substantially as described.

9. In an electrical street or station indicator, the combination, with the grooved drum having the projections thereon and the pivoted armature carried by the vertically-movable magnet-frame, of the U-shaped contact attached to said armature and the vibrating contact-needle, substantially as described.

10. In an electrical street or station indicator, the combination of a rotating drum having a series of projections surrounding its periphery or circumference, a vertically-moving electromagnet, an armature, an electrical contact-point carried by said armature, and a vibrating needle operated by the projections on the drum to complete an electric circuit with said contact, substantially as described.

11. In an electrical street or station indicator, the combination of the spirally-grooved drum, the upright rod, and the magnet-frame vertically movable on said rod and formed to partly fit the groove of the drum, substantially as described.

12. In an electrical street or station indicator, the combination of the rotating drum formed with the spiral groove on its circumference and provided intermediate of said groove with a series of projections, the upright rod, the magnet-frame vertically movable on said rod and formed to partly fit said groove, the magnet and armature carried by said frame, and the electrical contacts, substantially as described.

13. In an electric street or station indicator, the combination of the magnet P and armature Q, the points or contacts $k$ $k'$, the grooved revolving drum, the movable magnet-frame and its magnet, automatic electric contacts supported by said frame, the electric circuit comprised by conductors 3, 4, and 5, and an electric battery, substantially as described.

14. In an electric street or station indicator, the combination of the duplicate sets of magnets, the intermediate armature and its lever, the contacts $k$ $k'$, the movable ribbon having the contact-pieces, the contact-points $d$ $d'$ for engaging said pieces, the lower magnet and its movable frame, the circuit comprised by conductors 5' 6' 7 7', and a suitable battery, substantially as described.

15. In an electrical street or station indicator, the combination of the duplicate sets of magnets, their armature and its lever, the traveling indicator-band having the series of contacts, the stationary contacts $d$ $d'$, the switch or cut-off, a battery, and the circuit comprised by these parts and the conductors 7 7', substantially as described.

16. The combination of the indicator mechanism proper, the stopping and releasing magnets and the circuits including the same, the indicator-detent connected to and operated by an armature-lever common to both of said magnets, the two sets of contacts $c'''$ $d^x$ and $c'$ $d$ $d'$ included, the former in the releasing-circuit, the latter in the stopping-circuit, the contacts $k$ in the releasing-circuit, the contact $k'$ in the stopping-circuit, the movable contact T, common to both of the last-named contacts, and the mechanically-actuated rotating contact-closer for operating the set of contacts $c'''$ $d^x$ of the releasing-circuit, substantially as and for the purposes hereinbefore set forth.

17. The combination, with the indicating mechanism proper, the stopping and releasing magnets, the circuits therefor, and the two sets of contacts included in each circuit, and the indicator-detent actuated from the armature-lever of the said magnets, of the circuit-breaking magnet $N^2$, included in a circuit containing contacts operated and controlled by and from the releasing and stopping magnets, an armature-lever for said magnet $N^2$, which carries the contacts $c'''$ $d^x$ of the releasing-circuit, and a mechanically-actuated rotating contact-closer which operates to intermittently close the last-named contacts, the combination being and acting substantially as set forth.

In testimony whereof I affix my signature in presence of two witnesses.

RUBEN B. AYRES.

Witnesses:
ALOIS J. BUCHHIST,
GEO. W. MULLEM.